3,259,482
SLOW RELEASE FERTILIZER WITH A PLURALITY OF EPOXY/POLYESTER RESIN COATINGS

Louis I. Hansen, Minneapolis, Minn., assignor to Archer-Daniels-Midland Company, Minneapolis, Minn., a corporation of Delaware
No Drawing. Filed Oct. 14, 1965, Ser. No. 496,135
14 Claims. (Cl. 71—64)

This is a continuation-in-part of Serial No. 132,383, filed August 18, 1961, now Patent No. 3,223,518.

The present invention relates to coated fertilizers and to the preparation thereof. In one aspect, the present invention relates to fertilizer products comprising a core of fertilizer (e.g., in granular, pelletized or prilled form) which is surrounded by a plurality of water insoluble coatings. These coatings delay and effect a slow and gradual release of the water soluble plant nutrients contained in the fertilizer. These coatings also facilitate handling and storage of the fertilizer. Typically, these coatings each amount to from about 0.1 to 5% by weight based on the weight of the core.

Aside from the dusting and caking problems frequently associated with the use of ordinary fertilizers, one of their major disadvantages is that they are leached too rapidly into the soil. This rapid leaching causes plants to be burned. As a result, care must be taken to avoid excessively heavy applications of fertilizer (to thereby prevent burning). To do this frequently necessitates several applications of fertilizer throughout a growing cycle. Further, the rapid leach rate of ordinary fertilizers has also been known to cause plants to grow in spurts. Thus, an abnormally high growth rate frequently follows a fertilizer application. This growth rate diminishes rapidly as the fertilizer is depleted. Throughout successive applications of fertilizer, this cycle of high growth rate followed by a rapid diminishing of the growth rate is apparent. Further, the high leach rate associated with common fertilizers also causes water soluble plant nutrients to be lost since they are made available to plants faster than the plants can utilize them.

Consequently, it is desirable that fertilizer products be provided which offer a metered or gradual release of the water soluble fertilizer components to thereby provide a uniform rate of growth. Such a slow release fertilizer would also offer the advantage that larger amounts of fertilizer could be included in any given application. Thus, the necessity for subsequent applications could be substantially reduced or even eliminated entirely. Moreover, the losses of fertilizer associated with high leach rates could be avoided.

Various attempts have been made to develop anti-caking fertilizers, dust-free fertilizers, and to a lesser extent, slow-release fertilizers. For example, the use of materials such as stearic acid or diatomaceous earth, have been reported as assisting the free-flowing and non-caking qualities of fertilizer granules without providing a metered release of the soluble components of the fertilizer.

I have discovered, and this discovery forms a basis for the present invention, that an effective slow-release fertilizer can be prepared by encapsulating or coating fertilizer with a mixture of an epoxidized compound (e.g., epoxidized soybean oil) and a polyester curing agent for the epoxidized compound. This mixture, when dried or cured, provides a water-insoluble coating around the fertilizer and performs a metering function which delays and effects the slow and gradual release of water-soluble components contained in the fertilizer. This slow rate of release can be controlled to provide a substantially uniform rate of release over extended periods of time. Typically, a high analysis fertilizer (e.g., 10–10–10) is encapsulated with a plurality of these coatings to provide a slow-release fertilizer which minimizes leaching losses, prevents plant overfeeding, and the like. During use, the coating or shell which surrounds the core of fertilizer has been noted to remain intact.

The present invention is applicable to both organic and inorganic fertilizers which contain water soluble plant nutrients. Such fertilizers contain plant nutrients, frequently in the form of water soluble salts of such elements as carbon, nitrogen, oxygen, phosphorus, sulfur, potassium, calcium, magnesium, manganese, zinc, copper, boron, chlorine, and the like as well as other trace elements (reference is made to the Yearbook of Agriculture, USDA, 1957, page 81). Especially well adapted to the present invention are the commercially produced inorganic fertilizers containing nitrogen, phosphorous and potassium. These are generally prepared as heterogeneous granules, prills, and the like. The present invention is also applicable to such single component fertilizers as ammonium nitrate, urea, potassium chloride, and the like. Common fertilizers designated as 8–24–12, 8–8–6, 5–20–20, 12–12–12, 14–16–0, 4–8–6, 3–9–6, 39–0–0, 9–39–0, 10–10–10, 20–10–5, 0–46–0, and the like, are well suited for use in the present invention. All of these fertilizers may optionally contain supplementary additives such as trace elements, iron salts, insecticides, herbicides, fungicides, and the like. Further, the plant nutrients may be impregnated on or admixed with inert materials, e.g., silica, coke, and the like.

The primary coating or encapsulating materials of the present invention are mixtures of curable epoxidized compounds and polyester curing agents for the epoxidized compounds. Such epoxy/polyester resin systems (as are herein contemplated) were described by Robert A Boller and Dr. Richard B. Graver in U.S. patent application Serial Number 88,613, filed February 13, 1961, now Patent No. 3,218,274. In that application, they have described a stable, two-package, coating composition. One of the two packages contained curable epoxidized fatty compound, e.g., epoxidized soybean oil. The second of the two packages contained polyester curing agent for the epoxidized fatty compound contained in the first package. At or about the time of use, the contents of the two packages were combined and the resulting mixture spread in film form on a suitable substrate (e.g., wood) and cured (e.g., by baking or air drying) to thereby provide a decorative or protective coating. I have discovered that slow-release fertilizers can be prepared by encapsulating fertilizer with this same film-forming combination of epoxy and polyester.

THE EPOXY COMPONENT

The epoxy component used in this invention will ordinarily consist essentially of a curable, epoxidized fatty compound. Such epoxidized fatty compounds include epoxidized fatty oils, epoxidized fatty acid esters of monohydric alcohols, epoxidized fatty acid esters of polyhydric alcohols, epoxidized fatty nitriles, epoxidized fatty amides, epoxidized fatty amines, and epoxidized fatty alcohols. Such epoxidized fatty compounds are already well known in the art. Typically, these epoxidized fatty compounds will have 8 to 26 carbon atoms, e.g., 12 to 22 carbon atoms, in the fatty radicals and have an internal oxirane value of from 3% to 10%. I prefer that the oxirane value of the epoxidized fatty compounds be at least 6%.

If desired, epoxidized compounds of different types and oxirane values can be blended together to obtain various properties, e.g., improved drying speed and the like. However, it should be realized that improvements in certain properties are usually accompanied by a decrease in some other property, e.g., speed of drying can be increased, but pot life is generally (though not always) reduced at the same time.

Particularly preferred for use as the epoxy component of this invention are the curable epoxidized fatty esters. These epoxidized esters will generally contain from 8 to 26 carbon atoms, e.g., 12 to 22 carbon atoms with internal oxirane groups in the fatty radicals, and 1 to 10 carbon atoms in the mono- or polyhydric alcohol portion, with or without internal oxirane groups in the alcohol portion. Thus, the following esters are contemplated for use in this invention: epoxidized soybean oil; epoxidized linseed oil; epoxidized safflower oil; epoxidized 2-ethylhexyl tallate; epoxidized 1,5-pentanediol dioleate; epoxidized 1,2,6-hexanetriol dioleate monoacetate; epoxidized methyl oleate; epoxidized glycerol trilinoleate; epoxidized glycerol trioleate; epoxidized glycerol mono-oleate; epoxidized glycerol monolinoleate; epoxidized monostearate dilinoleate; epoxidized esters of mono-, di- or polypentaerythritol with soy, tall or linseed fatty acids; and the like.

I do not mean to imply that all epoxidized fatty compounds are equally effective in practicing the present invention. They are not. Thus, while one can obtain benefits from my invention by using, for example, a blend of epoxidized methyl oleate and 9,10-epoxy octadecanol, I strongly prefer to employ epoxidized fatty acid esters of saturated, aliphatic, polyhydric alcohols as the major epoxy component. Epoxidized glyceride oils (e.g., epoxidized linseed oil) are particularly preferred. I recommend that at least 80 weight percent and preferably 90% or more of the epoxy component be made up of the preferred epoxidized fatty esters. Especially preferred are the epoxidized fatty acid esters of saturated aliphatic polyhydric alcohols having 3 or more hydroxyl groups before esterification. The remainder of the epoxy component can be some other epoxidized fatty compound (e.g., epoxidized oleyl nitrile). Alternatively, and preferably, the epoxy component will consist essentially of an epoxidized ester or mixture thereof.

If desired, up to 20 weight percent, e.g., 5% to 10%, of the epoxy component can consist of non-fatty epoxidized compounds such as the bisphenol-epichlorohydrin resins and alicyclic diepoxides. Thus, a portion of the epoxy component can be a material such as Epon 828, Unox 201, or the like. However, significant advantages (in terms of the performance of the epoxy/polyester system) have been observed when epoxidized materials having internal oxirane are employed. Because of these differences in performance (e.g., as reflected by the speed of drying, hardness, and the like), I prefer to employ an epoxidized fatty compound (or a mixture thereof) having internal oxirane as at least 80 weight percent, and preferably 90 weight percent or more, of the epoxy component. Especially useful fertilizer products have been prepared by using epoxidized fatty esters as the sole epoxy component.

THE POLYESTER CURING AGENT

The polyester component used in the present invention is the simple esterification reaction product of a polyhydric alcohol with a polycarboxylic acid. In a sense, the polyester curing agent can be viewed as a partial ester or as a carboxyl terminated polyester having an average of at least two free carboxyl groups. It is convenient to think of the polyester as being a polyhydric alcohol wherein at least two hydroxyl groups have been esterified with polycarboxylic acid. In its simplest form, the polyester component of this invention can be viewed as follows:

(polycarboxylic acid)-(polyhydric alcohol)-(polycarboxylic acid)

Of course, the esterification reaction product may not be as simple as represented above. It is recognized that the reaction may also yield some polymeric polyester as well as some unreacted polycarboxylic acid and/or unreacted polyhyric alcohol. In any event, the predominant species is the simple alcohol-centered, partial ester or carboxyl terminated polyester represented above. This can be verified, in part, by a determination of number average molecular weight and infrared analysis. It should also be understood that more than two hydroxyl groups in the polyhydric alcohol can be esterified with polycarboxylic acid. Thus, the simple formula represented above should only be considered as illustrative of the type of material herein contemplated.

The esterification reaction product can also be represented by the structural formula:

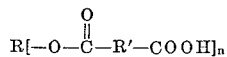

wherein $n$ is at least two (e.g., 3 or 4), wherein R is the polyhydric alcohol residue, and wherein R' is the polycarboxylic acid residue.

The polyhydric alcohols useful in forming the polyester curing agents of the present invention include hydrogenated bisphenol-A, ethylene glycol, propylene glycol, glycerol, trimethylol ethane, trimethylol propane, sorbitol, (d)alpha methyl-glycoside, 1,6-cyclohexane dimethanol, and preferably pentaerythritol, dipentaerythritol, tripentaerythritol, and the like. Mixtures of these polyhydric alcohols can be employed. The saturated, aliphatic alcohols, particularly those saturated, aliphatic alcohols having 3 or more hydroxyl groups, are preferred. As previously indicated, pentaerythritol (pure or technical grade) is particularly preferred.

The polycarboxylic acids useful in preparing the polyester curing agents of this invention include chlorendic acid (i.e., hexachloroendomethylene tetrahydrophthalic acid), maleic acid, trimellitic acid, tetrachlorophthalic acid, monochlorophthalic acid, tetrahydrophthalic acid, hexahydrophthalic acid, and the like. The corresponding anhydrides can also be employed. Mixtures of polycarboxylic acids can be employed. The various phthalic acids and chlorendic acid are preferred. Chlorendic acid, alone or in combination with a phthalic acid (e.g., phthalic anhydride), is particularly preferred.

In preparing the polyester curing agents for use in this invention, the esterification reaction mixture should initially contain (i.e., before any esterification takes place) a ratio of carboxyl to hydroxyl groups of from 1:1 to 3:1. Preferably, this ratio will be within the range of from 1.6:1 to 2.2:1, and even more preferably about 1.8 carboxyl groups for each hydroxyl group. The esterification reaction is conducted in the manner illustrated by the specific examples (hereinafter set forth) to preferably react most or all of the available hydroxyl groups. The resulting esterification reaction product should have an acid value of at least 50, and preferably of at least 100. Acid values over 140, e.g., about 150 to 180, are especially desirable.

USE OF THE EPOXY/POLYESTER SYSTEM TO COAT FERTILIZER

Typically, the epoxy component and the polyester curing agent are each diluted with solvent, frequently to a non-volatile content of 40 to 60 weight percent. Suitable solvents include those solvents already well known to the coatings art, e.g., xylene, toluene, Cellosolve acetate, butyl alcohol and the like. At or near the time of use, the epoxy component and the polyester curing agent are mixed together, usually in the ratio of 50 to 150 parts by weight of polyester curing agent per 100 parts of epoxy component. The resulting mixture (which can optionally include various pigments, fillers, extenders, dyes, driers, stabilizers, and the like) is then applied in film form to the fertilizer to be coated.

In coating fertilizers according to the present invention, I have found that substantial benefits are obtained when a plurality of coatings (of one or more types) are employed, as opposed to a single coating. I have found that a single coating, regardless of amount, is generally inferior to a plurality of coatings of the same type, when the same total coating weight is employed. Although each of the coatings (on a 100% solids basis) can range from as little as, for example, 0.1 percent up to 10 percent or more, based on the weight of the core, I have found that individual coating weights of from 0.2 to 4 percent, on the same basis, are particularly well suited for the practice of my invention. Commonly, I apply a plurality of coatings of the epoxy/polyester coating material to a granular fertilizer, each in the amount of about 0.25 to 3 percent (on the same basis) and repeat these applications until the total coating weight is sufficient to provide a desired rate of release of the water soluble components contained in the fertilizer. Typically, the total weight of these coatings will be from 2 to 20 percent, more usually from 3 to 15 percent, based on the weight of the uncoated fertilizer. The total coating weight is also a function of the particle size of the fertilizer to be coated, the surface area of the fertilizer particles, the smoothness of the fertilizer particles, etc.

It should be noted that each of the coatings employed by me will not always appear as a separate, discrete coating on the final product. Further, in applying these coatings, any particular coating may not, by itself, completely encapsulate the core of fertilizer material. However, the combined effect of the plurality of coatings employed by me is to completely surround or encapsulate the core of fertilizer material with a water insoluble skin. When one realizes that I employ at least two coatings, and preferably more coatings, the degree of encapsulation and film integrity obtained by me can be appreciated. Fertilizer products prepared according to my invention are completely encapsulated or surrounded with a water-insoluble film. When the total amount of coatings is applied in the form of a plurality of thin films (this is preferable), I prefer to employ at least three and preferably six or more individual coatings.

In coating fertilizer granules, I employ the epoxy/polyester resin system in the form of a rapid drying solvent solution. Improved results are obtained if the fertilizer granules are pre-heated to, for example, 100° to 300° F. Each successive coating or layer should be dried at least to the point of incipient gelation so that it is not lifted by the solvent present in the subsequent wet coatings. I have found that tumbling and gently cascading the fertilizer granules together as the wet coatings are dried improves the rate of drying, improves film integrity, and assists in completely encapsulating the fertilizer. Agglomeration is also avoided and product durability is improved. Tumbling also helps spread the resin over the surface of the fertilizer granules by a rubbing or smearing action. When the final coating has been applied, the plurally coated fertilizer is then dried and cured to a tack-free state. The final product must be tack-free to avoid compaction and agglomeration problems. The net result is a fertilizer product comprising a core of fertilizer material surrounded by a plurality of cured coatings. These coatings provide a water insoluble shell or shield around the fertilizer and allow for the gradual release of water soluble plant nutrients, apparently as a result of osmotic action.

While this invention has been described with reference to a particular coating material, it is to be understood that I contemplate that the coating materials of this invention could be used in conjunction with other coating materials. Thus, where granules having a highly irregular surface are to be coated, I would suggest that this surface be treated in some fashion (i.e., as by pre-coating the granules) to thereby form smoother granules. In this manner, it is possible to reduce the amount of the more expensive coating material which is required to obtain the same degree of encapsulation, film integrity, and the desired rate of release. Similarly, over-coatings can be utilized to provide better eye appeal, and the like. In any event, it is to be understood that my invention involves providing a granular fertilizer with a plurality of coatings of the particular coating material herein described.

The present invention will be further understood by reference to the following specific examples which include a preferred embodiment. Unless otherwise indicated, all parts and percentages are by weight. In these examples, the equipment used for coating the fertilizer was a horizontally mounted drum about 36 inches long and 16 inches in diameter. Means were provided to allow hot air to be passed axially through the drum. The air flow rate could be varied from about 200–500 c.f.m. Typically, the air flow rate was about 350 c.f.m. An open gas flame was used to pre-heat the air. Although the temperature of the air could be as high as 300° F. or higher, it was usually kept within the range of 200°–250° F. During coating operations, the drum was rotated at a peripheral speed which could be varied from 50 inches per minute to 500 inches per minute. Typically, the speed was about 130–140 inches per minute. Baffles located within the drum were used to reduce the tendency of the fertilizer to ball-up during the coating operation.

Leach rates were determined in the following manner: a twenty (20) gram sample of fertilizer was placed in an 8 ounce screw-top bottle and 100 ml. of water was then added. The bottle was sealed and then shaken gently until all the fertilizer granules were wet. The jar was then allowed to stand at room temperature (e.g., 70–75° F.) for a pre-selected period of time (e.g., 24 hours). At the end of this time, the contents of the bottle were again shaken to obtain a uniform solution. The solution was then passed through filter paper to remove undissolved particles, etc. A 5 ml. portion of the filtrate was then dried. The weight of the dry residue (if any) in grams, multiplied by 100 gave the percent of material leached from the fertilizer (based on the total weight of the coated fertilizer before leaching). A temperature of about 200° F. was used for drying the filtrate.

EXAMPLES OF THE EPOXY COMPONENTS

*Example I*

Epoxidized soybean oil such as that sold under the trademark "Admex 710." Typically, this epoxidized oil (a fatty triglyceride) will have an oxirane content of about 6.8%, a Gardner color of 1, a viscosity of about 5 stokes, and an iodine value of less than 5. Other epoxidized soybean oils sold commercially and containing varying percentages of oxirane oxygen (e.g., up to 7%) and iodine values as low as about 1 can be used.

*Example II*

Epoxidized safflower oil having an oxirane value of about 7.4%.

*Example III*

Epoxidized linseed oil having an oxirane value of about 9.0%.

*Example IV*

Epoxidized 2-ethyl hexyl tallate. Typically, this material has the following characteristics: an acid value of 0.2, a Gardner color of 1, a viscosity of 0.5 stoke, a specific gravity of 0.923, and an oxirane content of 4.4%.

*Example V*

Epoxidized 1,5-pentane diol dioleate. Typically, this material has the following characteristics: an acid value of 0.2, a Gardner color of 1, a viscosity of 1.1 stokes, a specific gravity of 0.945, and an oxirane content of 4.1%.

*Example VI*

Epoxidized 1,2,6 - hexanetriol dioleate monoacetate. Typically, this material has the following characteristics: an acid value of 0.2, a Gardner color of 4, a viscosity of 2.3 stokes, a specific gravity of 0.970, and an oxirane content of 3.7%.

Example VII

Epon 828, a liquid bisphenol epichlorohydrin resin having an epoxide equivalent of 175–210. The epoxide equivalent is the number of grams of resin containing one gram equivalent of epoxide.

EXAMPLES OF THE POLYESTER CURING AGENT

Example VIII

A polyester curing agent based on phthalic anhydride and pentaerythritol.

375 parts phthalic anhydride, 120 parts of pentaerythritol, and 30 parts xylol were charged to a reaction flask equipped with a stirrer, thermometer and condenser. The mixture was esterified by heating it to 300° to 320° F. and holding it there for about 30 minutes. After cooling to 250° F., 160 parts n-butanol and 130 parts xylol were added. The solvent solution of the esterification reaction product thus obtained had a viscosity of 7.3 stokes, a color of 1 on the Gardner-Holdt scale, and was 60% non-volatile (NV). The acid value, corrected to 100% NV was 287.

Example IX

Polyester curing agent based on phthalic anhydride, maleic anhydride and pentaerythritol.

250 parts phthalic anhydride, 83 parts maleic anhydride, 120 parts pentaerythritol, and 30 parts xylol were esterified as in Example VIII. The product was reduced to 60% NV (i.e., 40% solvent) using 115 parts xylol and 145 parts butanol. The viscosity of the solution was 11.2 stokes, and the acid value (corrected to 100% NV) was 312.

Example X

Polyester curing agent based on phthalic anhydride, chlorendic anhydride, and pentaerythritol.

148 parts of phthalic anhydride, 386 parts of chlorendic anhydride, 160 parts pentaerythritol, and 20 parts xylol were charged to a reactor equipped with a stirrer, thermometer, condenser and water trap for removing water of esterification. This mixture was esterified at 300° to 310° F. to an acid value (corrected to 100% NV) of 160, at which time 18 parts of water had been distilled off. The reaction product was cooled and thinned with 100 parts butanol and 240 parts xylol. The final product was 65% NV and had a viscosity of 49.3 stokes.

Example XI

Polyester curing agent based on phthalic anhydride, chlorendic anhydride, and pentaerythritol.

148 parts of phthalic anhydride, 386 parts hexachlorendomethylene tetrahydrophthalic anhydride (i.e., chlorendic anhydride), 80 parts pentaerythritol, and 20 parts of xylol were esterified as in Example X to an acid value (corrected to 100% NV) of about 170. The esterification reaction product was thinned to 70% NV with 80 parts butanol and 180 parts xylol. The solution viscosity was 74.4 stokes.

Example XII

Polyester curing agent based on chlorendic acid and pentaerythritol.

482.5 parts of chlorendic acid, 50 parts of pentaerythritol, and 200 parts of xylol were esterified as in Example X to an acid value (corrected to 100% NV) of 100. The esterification reaction product was then thinned to 60% NV using 52.2 parts xylol and 67.5 parts of the acetate of the mono-ethyl ether of ethylene glycol (i.e., Cellosolve acetate). The solution viscosity was 3.3 stokes.

Example XIII

Polyester curing agent based on phthalic anhydride, chlorendic acid, and pentaerythritol.

222 parts of phthalic anhydride, 193 parts of chlorendic acid, 80 parts pentaerythritol, and 208 parts xylol were esterified as in Example X to an acid value (corrected to 100% NV) of about 160. The esterification reaction product was then thinned to 60% NV using 54 parts xylol and 66 parts of the acetate of mono-ethyl ether of ethylene glycol. The solution viscosity was 37.4 stokes.

Example XIV

Polyester curing agent based on chlorendic acid and trimethylol ethane.

579 parts of chlorendic acid, 63 parts of trimethylol ethane, and 153 parts of xylol were esterified as in Example X to an acid value (corrected to 100% NV) of about 100. The esterification reaction product was thinned to 70% NV using 50 parts xylol and 60 parts of the acetate of the mono-ethyl ether of ethylene glycol (Cellosolve acetate). The solution viscosity was 117.8 stokes.

Example XV

Polyester curing agent based on tetrahydrophthalic anhydride, chlorendic acid, and pentaerythritol.

152 parts of tetrahydrophthalic anhydride, 386 parts chlorendic acid, 80 parts pentaerythritol, and 216 parts xylol were reacted as in Example X to an acid value (corrected to 100% NV) of about 170. The esterification reaction product was thinned to 65% NV using 51 parts xylol and 66 parts of the acetate of the mono-ethyl ether of ethylene glycol. The solution viscosity was 110 stokes.

Example XVI

Polyester curing agent based on hexahydrophthalic anhydride, chlorendic acid, and pentaerythritol.

154 parts hexahydrophthalic anhydride, 389 parts chlorendic acid, 80 parts pentaerythritol, and 217 parts of xylol were esterified as in Example X to an acid value (corrected to 100% NV) of about 170. The esterification reaction product was then thinned to 65% NV using 53 parts of xylol and 67 parts of the acetate of the monoethyl ether of ethylene glycol. The solution viscosity was 217 stokes.

Example XVII

Polyester curing agent based on phthalic anhydride, chlorendic acid, trimethylolpropane, and pentaerythritol.

148 parts of phthalic anhydride, 389 parts of chlorendic acid, 31.5 parts of pentaerythritol, 56.4 parts of trimethylolpropane, and 151.7 parts of xylol were esterified as in Example X to an acid value (corrected to 100% NV) of about 160. The esterification reaction product was then thinned to 60% NV using 172.1 parts xylol and 81 parts of the acetate of the mono-ethyl ether of ethylene glycol. The solution viscosity was 5 stokes.

EXAMPLES OF THE COATED FERTILIZER

Example XVIII

A granular, high analysis fertilizer (Smith-Douglass 16–8–8) was precoated with 9% of resin A and then plurally coated with 4.5% of an epoxy/polyester resin system (hereinafter called resin B) in the following manner:

The uncoated fertilizer was placed in the rotating drum and pre-heated to about 250° F. Then each coating or layer was applied by introducing the necessary amount of resin through a long piece of aluminum tubing and spraying the hot, tumbling, fertilizer granules with a thin stream of the resin. Simultaneously, hot air (260° F.) was passed through the drum. Five (5) coatings of resin A were applied; the first amounted to 3% of the weight of the fertilizer and the remaining four each amounted to 1½% on the same basis (all referring to 100% resin solids). Next, three (3) coatings of resin B were applied, each amounting to 1½% on the same basis. A five-minute interval was allowed between each application of resin A and a ten-minute interval was allowed between each application of resin B to thereby ensure that the previous coating (in each instance) had dried at least to the point of incipient gelation. After the last coating of resin B was applied, the heat was removed and the hot, coated granules were allowed to tumble (with the air still coming through the drum) until the coated fertilizer granules were tack-free. Then, the coated fertilizer was removed from the drum and tested. The 72 hour leach rate was only 0.7%.

Resin A was a rapid drying solvent solution of a copolymer of (1) dicyclopentadiene and (2) a modified vegetable oil. This copolymeric resin is commercially available under the trademark Admerol 351. Resin B was a rapid drying solvent solution of a blend (approximately 50/50 on solids) of (1) a mixture of epoxidized soybean oil and epoxidized linseed oil wherein the mixture had an oxirane value above 7% and (2) a polyester curing agent having an acid value (determined for 100% solids) of about 160-170 and prepared from phthalic anhydride, chlorendic acid, and pentaerythritol, wherein the initial ratio of carboxyl groups to hydroxyl groups (before esterification) was about 1.8 to 1. The solvent was a mixture of xylol and Cellosolve acetate.

Example XIX

Example XVIII was repeated using a different solvent system for resin B. The 72 hour leach was 0.3%. This example illustrates the fact that the choice of solvents (aside from compatibility and volatility considerations) does not materially affect the performance of fertilizer products produced according to this invention.

Example XX

Smooth urea prills (fertilizer grade) are coated with resin B by following the procedure of Example XVIII. In this illustrative example, no pre-coating is involved. A total of 5% of resin B is applied in the following manner: a first coating of 2% is applied (on a 100% solids basis), followed by six coatings each amounting to 0.5% (on the same basis). The resulting produce (i.e., plurally coated urea) is a slow-release fertilizer. The film or skin surrounding the core of urea is water insoluble.

Example XXI

Granular ammonium nitrate is coated by the procedure of Example XVIII. In this illustrative example, no pre-coating is involved. A total of 8% of an epoxy/polyester resin system is applied in the following manner: a first coating of 3% is applied, followed by 5 successive coatings of 1% each. A 15-minute interval is allowed between each coating application for the purpose set forth in Example XVIII. The resulting product (i.e., plurally coated ammonium nitrate) is a slow-release fertilizer.

The epoxy/polyester resin system of this example is a mixture of (a) 30 parts of a 60% NV solution of polyester curing agent, (b) 20 parts of a 90% NV blend of epoxidized soybean oil and epoxidized linseed oil and (c) 10 parts of xylol. The curing agent is prepared from a mixture of phthalic anhydride, chlorendic acid, and technical grade pentaerythritol wherein the initial ratio of carboxyl to hydroxyl groups (before esterification) is about 1.8:1. The acid value of the polyester (100% NV) is about 160-170. The oxirane content of the blend of oils is above 7%.

Examples XXII-XXV

Slow release fertilizers are prepared by coating a granular, high analysis fertilizer (e.g., 20-10-5) with different epoxy/polyester resin systems. In each of these illustrative examples, an initial coating of 3% is applied, followed by three coatings of 2% each (on the basis of 100% solids).

In Example XXII, the epoxy/polyester system is a mixture of (a) 30 parts of the polyester curing agent of Example XXI, (b) 20 parts of a 90% NV blend of epoxidized soybean oil having an oxirane content of about 6.8% (Admex 710) and a non-fatty diepoxide (Unox 201) in a weight ratio of 92:8, and (c) 10 parts of xylol.

In Example XXIII, the epoxy/polyester system is a mixture of (a) 30 parts of a 60% NV solution of polyester curing agent, (b) 20 parts of a 90% NV solution of epoxidized linseed oil, and (c) 10 parts of xylol. The polyester curing agent of Example VIII is used. The oxirane value (internal) of the epoxidized linseed oil is about 9%.

In Example XXIV, the epoxy/polyester system is a mixture of (a) 15 parts of the polyester curing agent of Example XXI, (b) 15 parts of the polyester curing agent of Example VIII, (c) 20 parts of the blend of epoxidized fatty esters of Example XXI, and (d) 10 parts of xylol.

In Example XXV, the epoxy/polyester system is a mixture of (a) 30 parts of a 60% NV blend of polyester curing agents, (b) 20 parts of a 90% NV blend of epoxidized fatty compounds, and (c) 10% of xylol. The blend of curing agents is a 1:1 blend of (1) the polyester curing agent of Example VIII and (2) a polyester curing agent prepared from phthalic anhydride, chlorendic acid and di-pentaerythritol (no mono pentaerythritol) in the manner shown in Example X. The blend of epoxidized fatty compounds was a blend of epoxidized linseed oil, epoxidized oleyl nitrile, and epoxidized 1,2,6-hexanetriol mono-acetate dioleate in the ratio of 85/5/10.

Having described the present invention with a certain degree of particularity, it will be realized that numerous minor changes and variations, falling within the spirit and scope of this invention, will become obvious to those skilled in the art. It is not intended that this invention be limited to any of the coating materials which have been mentioned as specific examples nor by any of the specific proportions which have been given for the sake of illustration, but it is intended to claim all novelty inherent to the invention, as well as all obvious modifications and variations thereof.

What is claimed is:

1. A coated fertilizer comprising:
   (a) a core of granular fertilizer containing at least one water soluble plant nutrient selected from the group consisting of water soluble compounds of nitrogen, phosphorus, and potassium;
   (b) a plurality of cured coatings of an epoxy/polyester resin system surrounding said core, each of said coatings being in the amount of from about 0.1 to 10 percent by weight of said core, and,
   (c) the total coating weight being such as to delay and effect a slow and gradual release of said water soluble plant nutrient;
   (d) said cured coatings of epoxy/polyester resin system being the reaction product of:
      (1) epoxy component consisting of at least 80% by weight of epoxidized fatty compound, said epoxidized fatty compound having 8-26 carbon atoms in its fatty radicals and an internal oxirane value of 3% to 10%, and
      (2) polyester curing agent for said epoxidized fatty compound, said curing agent being the esterification reaction product of polyhydric alcohol and polycarboxylic acid wherein the polyester is prepared from an esterification reaction mixture which initially has a carboxyl to hydroxyl ratio of 1-3:1; said esterification reaction product comprising polyester of the formula:

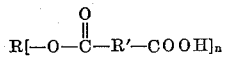

wherein $n$ is at least two, wherein R is polyhydric alcohol residue and wherein R′ is polycarboxylic acid residue; said polyester curing agent having an acid value of at least 50.

2. The coated fertilizer of claim 1 wherein said epoxy component contains up to 20% by weight of a non-fatty epoxidized compound.

3. The coated fertilizer of claim 1 wherein said epoxy component consists essentially of epoxidized fatty compound, and wherein at least 80% by weight of said epoxidized fatty compound is epoxidized fatty acid ester of saturated, aliphatic, polyhydric alcohol.

4. The coated fertilizer of claim 1 wherein said epoxy component comprises epoxidized soybean oil.

5. The coated fertilizer of claim 1 wherein the total coating weight is 3–15% of the weight of the core, wherein said epoxidized fatty compound has an internal oxirane value of at least 6%, wherein said acid value is at least 100, and wherein said polycarboxylic acid comprises chlorinated polycarboxylic acid.

6. The coated fertilizer of claim 5 wherein said initial ratio of carboxyl to hydroxyl groups is from 1.6–2.2:1 and wherein said polycarboxylic acid comprises chlorendic acid.

7. The coated fertilizer of claim 5 wherein said polyhydric alcohol has at least three hydroxyl groups before esterification and wherein the acid value is at least 140.

8. The coated fertilizer of claim 7 wherein a mixture of polyhydric alcohols is used and wherein the initial raito of carboxyl to hydroxyl groups is about 1.8:1.

9. The coated fertilizer of claim 7 wherein each of said coatings amounts to from about 0.2 to 4% based on the weight of the core.

10. A coated product useful as a fertilizer, said product comprising:
 (a) a core of granular material containing at least one water soluble plant nutrient;
 (b) a plurality of cured coatings of an epoxy/polyester resin system surrounding said core, each of said coatings being in the amount of from about 0.1 to 5 percent of the weight of said core; and
 (c) the total weight of coatings being in the range of 2 to 20 percent of the weight of the core;
 (d) said cured coatings of epoxy/polyester resin system comprising the reaction product of:
  (1) epoxidized fatty triglyceride oil having 8–26 carbon atoms in the fatty radicals and an internal oxirane value of at least 6%, and
  (2) polyester curing agent for said epoxidized oil, said polyester curing agent having an acid value of at least 100; said curing agent being the esterification reaction product of polyhydric alcohol and polycarboxylic acid wherein the esterification reaction product comprises polyester of the formula:

$$R[-O-\overset{O}{\underset{\|}{C}}-R'-COOH]_n$$

wherein $n$ is at least two, wherein R is polyhydric alcohol residue and wherein R' is polycarboxylic acid residue.

11. The product of claim 10 wherein said polycarboxylic acid comprises chlorendic acid and wherein said polyhydric alcohol comprises pentaerythritol.

12. The product of claim 10 wherein said polyester curing agent is the esterification reaction product of phthalic anhydride, chlorendic acid, and pentaerythritol wherein the ratio of carboxyl to hydroxyl groups, before esterification, is from 1.6–2.2:1.

13. The product of claim 12 wherein said epoxidized oil comprises epoxidized soybean oil.

14. The product of claim 13 wherein said granular material is urea and wherein at least three coatings are present.

References Cited by the Examiner

UNITED STATES PATENTS

| | | | |
|---|---|---|---|
| 3,069,370 | 12/1962 | Jensen et al. | 260—23 |
| 3,158,462 | 11/1964 | Wilson | 71—4 |
| 3,186,828 | 6/1965 | Baarson et al. | 71—64 |
| 3,205,061 | 9/1965 | Mason | 71—28 |
| 3,223,518 | 12/1965 | Hansen | 71—64 |

DONALL H. SYLVESTER, *Primary Examiner.*

G. W. RUTHERFORD, *Assistant Examiner.*